United States Patent
Suzuki

(10) Patent No.: US 9,234,970 B2
(45) Date of Patent: Jan. 12, 2016

(54) PORTABLE RADIATION DOSIMETER

(71) Applicant: National Institute of Advanced Industrial Science and Technology, Tokyo (JP)

(72) Inventor: Ryouichi Suzuki, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 14/377,675

(22) PCT Filed: Feb. 8, 2013

(86) PCT No.: PCT/JP2013/053051
§ 371 (c)(1),
(2) Date: Aug. 8, 2014

(87) PCT Pub. No.: WO2013/118866
PCT Pub. Date: Aug. 15, 2013

(65) Prior Publication Data
US 2015/0355349 A1    Dec. 10, 2015

(30) Foreign Application Priority Data

Feb. 10, 2012 (JP) ................................. 2012-027268
Feb. 10, 2012 (JP) ................................. 2012-027314

(51) Int. Cl.
*G01T 7/12* (2006.01)
*G01T 1/02* (2006.01)

(52) U.S. Cl.
CPC .. *G01T 7/12* (2013.01); *G01T 1/026* (2013.01)

(58) Field of Classification Search
CPC ................................. G01T 1/026; G01T 7/12
See application file for complete search history.

(56) References Cited

U.S. PATENT DOCUMENTS 5,173,609 A    12/1992    Lacoste et al.
5,572,027 A    11/1996    Tawil et al.

FOREIGN PATENT DOCUMENTS

| GB | 2252819 | 8/1992 |
| JP | 2002-131435 | 5/2002 |
| JP | 2005-249483 | 9/2005 |
| WO | 2007061268 | 7/2007 |

OTHER PUBLICATIONS

International Search Report based on PCT/JP2013/053051, dated May 14, 2013.
Supplemental European Search Report relating to co-pending European Application No. EP13746731, dated Sep. 9, 2015; 3 Pages.

*Primary Examiner* — Mark R Gaworecki
(74) *Attorney, Agent, or Firm* — McCarter & English

(57) ABSTRACT

A microcontroller unit (3) measures and records a radiation exposure dose obtained from a detection output of a radiation detection unit (2), and when the radiation exposure dose or dose rate exceeds a predetermined threshold, issues a warning to the user by lighting or blinking a LED (4). The LED (4) is placed opposite a light-emitting/receiving element (62) of an electrical non-contact input device (6) provided on a display device (5), and is also used to transmit and receive recorded radiation dose data and a command or data transmitted from the non-contact input device (6). According to such a configuration, a portable radiation dosimeter that is compact and can manage the radiation exposure dose for a long term without placing a burden on the wearer can be realized.

8 Claims, 4 Drawing Sheets

PORTABLE RADIATION DOSIMETER

RELATED APPLICATIONS

This application is a national stage application filed under 35 USC 371 of PCT/JP2013/053051, filed Feb. 2, 2013, which claims the benefit of Japanese Patent Application No. 2012-027268, filed Feb. 10, 2012 and Japanese Patent Application No. 2012-027314, filed Feb. 10, 2012, all of which are incorporated herein, in entirety, by reference.

TECHNICAL FIELD

The present invention relates to a portable radiation dosimeter for measuring the radiation exposure dose.

BACKGROUND ART

In recent years, radioactive materials have spread across wide areas due to accidents of nuclear power plants, and not only have areas around the power plants been affected but also areas with a high level of radiation dose have been generated as hot spots. Thus, the influence of radiation exposure on residents in the neighboring areas is concerned.

From such circumstances, it is strongly demanded that not only the radiation doses of the neighboring areas or work areas to be decontaminated be measured and monitored, but also a radiation exposure sensor be provided on the human body to measure the level of radiation exposure of the human body through his/her whole-day activities for a long term so that the measured data can be used to decontaminate the neighboring areas or avoid radiation exposure of individuals.

As the simplest means for measuring the radiation exposure dose, there is known a film badge dosimeter that uses a chemical change of a substance that occurs upon incidence of radiation on the substance. Further, an electronic radiation dosimeter has also been used that counts pulse signals of radiation using a Geiger-Mueller counter and a diode, which is a semiconductor element, or using a scintillator and a photodiode, and displays the radiation dose by multiplying the count number by a scale factor.

The film badge dosimeter can only measure the cumulative value of the radiation exposure dose from the time the dosimeter is worn, and thus cannot measure how much and when a measured object was exposed to radiation or cannot accurately identify a place with a high radiation dose.

Patent Literature 1 and Patent Literature 2 below each propose a wrist-mount or clip-mount portable radiation dosimeter that includes a radiation detection unit having silicon semiconductor elements, a microcomputer, a display unit such as a LCD, and the like.

CITATION LIST

Patent Literature

Patent Literature 1: JP 2002-131435 A
Patent Literature 2: JP 2005-249483 A

SUMMARY OF INVENTION

Technical Problem

However, the above conventional art is based on the premise of displaying the radiation dose with the display unit, and thus, the dosimeter is expensive and is difficult to be reduced in size. Furthermore, as power consumption of the dosimeter is high, there is a problem in that the life of a built-in battery is short and it is thus difficult to measure the radiation exposure dose for a long period of time without causing a sense of burden to the wearer.

Accordingly, it is an object of the present invention to provide, as a function of a portable radiation dosimeter, a function of issuing a warning by blinking a small LED element only when the radiation exposure dose is particularly high, and also using the small LED element as an electrical non-contact input/output device, whereby detected data is output to a radiation management device with a display device, such as a computer provided at a base station, a laptop personal computer, a portable phone, or a smartphone, or a display without the need to perform complex operations, so that the radiation exposure dose can be displayed and managed for each individual.

Solution to Problem

In order to achieve the above object, in the present invention, a small LED element, which is used to issue a warning, is also used as an electrical non-contact input/output device.

A LED element is a PN-junction diode of a compound semiconductor, and thus generates photoelectromotive force when irradiated with light. Such a voltage is higher than the threshold for determining whether the logic in a process of a microcontroller (CPU) is at low level or high level, and the light can be converted into a digital signal.

In the present invention, the LED is also used as a light-receiving element using such a phenomenon, and is also used as an input device of the portable radiation dosimeter.

More specifically, in the portable radiation dosimeter of the present invention, the following technical means was taken.

(1) There is provided a portable radiation dosimeter including a radiation detection element, the dosimeter being configured to measure and record a radiation exposure dose from a detection output of the radiation detection element, the dosimeter further including: a LED configured to issue a warning to a user when a radiation exposure dose exceeds a predetermined threshold. The LED is placed opposite a light-emitting/receiving unit of an electrical non-contact input device that is provided in a radiation dose management device with a display device, and is used to transmit and receive recorded radiation dose data and a command or data transmitted from the non-contact input device.

(2) The portable radiation dosimeter according to claim 1 that uses a radiation detection semiconductor as the radiation detection element, further includes: a piezoelectric buzzer configured to issue a warning sound to a user using a piezoelectric element when the radiation exposure dose exceeds a predetermined threshold, the piezoelectric element used for the piezoelectric buzzer being configured to detect a shock or vibration applied to a main body unit of the radiation dosimeter; and a noise removal device configured to remove noise generated due to the shock or the vibration from a radiation dose detection value obtained with the radiation detection semiconductor.

(3) In the above portable radiation dosimeter, the LED is configured to be, when the main body of the radiation dosimeter is inserted into a slot provided in the non-contact input device, located opposite a light-emitting/receiving element provided in the slot, and transmit and receive the recorded radiation dose data and a command or data transmitted from the non-contact input device.

(4) In the above portable radiation dosimeter, the main body of the radiation dosimeter is integrated with an ID card capable of personal identification or is put in a card holder together with the ID card so as to measure the radiation exposure dose.

Advantageous Effects of Invention

In the present invention, according to (1) above, it is possible to, by providing a LED that issues a warning to a user through lighting or blinking, reduce the size of the radiation dosimeter while ensuring a warning function in an emergency. The LED is also used as an electrical non-contact input/output device, whereby the number of components and cost can be reduced. Furthermore, as data can be input and output without contact, a metal electrode need not be exposed to the outside. Thus, it is possible to avoid electrode-related troubles, such as contact failure, electrostatic discharge failure, and short circuit that would occur when the metal electrode becomes wet with rain, and the like.

According to (2) above, it is possible to issue a warning not only with the LED but also with sound by adding a piezoelectric buzzer. Furthermore, when the piezoelectric element used for the piezoelectric buzzer is used as a shock sensor, it becomes possible to surely avoid radiation dose detection errors when a radiation detection semiconductor is used even if a shock is applied to the main body unit of the radiation dosimeter. Thus, reliability can be increased.

In addition, according to (3) above, it is possible to, only by inserting the main body of the radiation dosimeter into the slot provided in the non-contact input device, automatically start transmission and reception of recorded radiation dose data and a command or data transmitted from the non-contact input device. Thus, operability can be improved.

Further, according to (4) above, it is possible to, by managing the radiation exposure dose of each individual in association with ID card information, avoid loss of the data and the like and further reduce possible detection errors that would occur upon application of a shock because a holder of the ID card absorbs the shock.

DESCRIPTION OF EMBODIMENTS

Hereinafter, embodiments of the present invention will be described with reference to the accompanying drawings.

Embodiments

Embodiment 1

Figure 1:
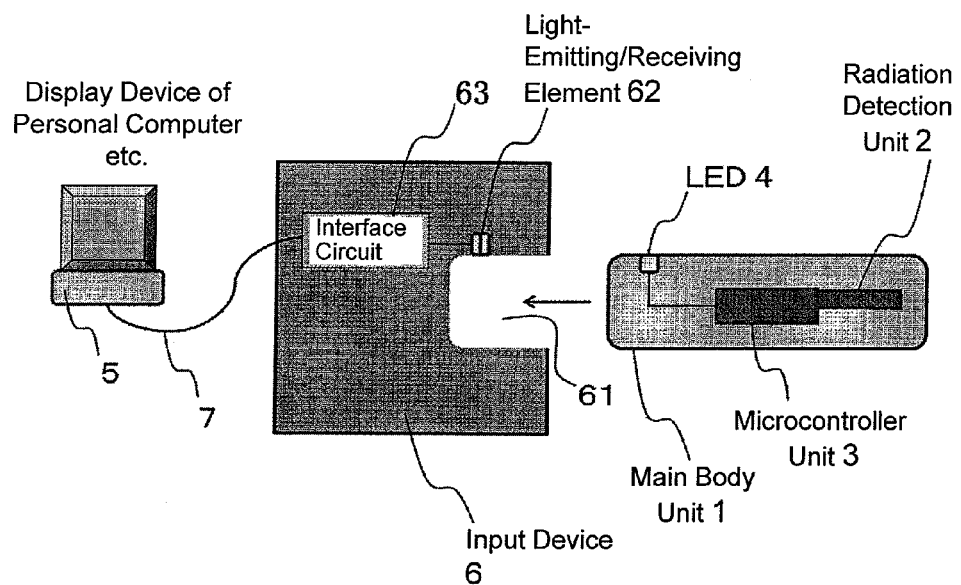
FIG. 1 is the entire system diagram of Embodiment 1.

FIG. 1 shows the entire device configuration.

A main body unit 1 of a radiation dosimeter has about a size that can be carried about in one's pocket or in an ID card case, and may have a clip, a pin, or the like for attachment to clothes and the like.

The main body unit 1 includes a radiation detection unit 2, a microcontroller unit (CPU) 3, and a small LED 4. An end of the main body unit 1 on the LED 4 side is adapted to be inserted into a slot 61 of an input device 6 that is connected to a radiation management device having a display device 5, such as a personal computer, so that the main body unit 1 and the input device 6 can be connected together. It should be noted that the input device 6 has a light-emitting/receiving element 62 that is arranged to be opposite the LED 4 when the main body unit 1 is inserted into the slot 61 of the input device 6. An interface circuit 63 is connected to the display device 5 via a cable 7. The light-emitting/receiving element 62 includes a light-emitting element such as a LED and a light-receiving element such as a photodiode or a phototransistor.

Figure 2:
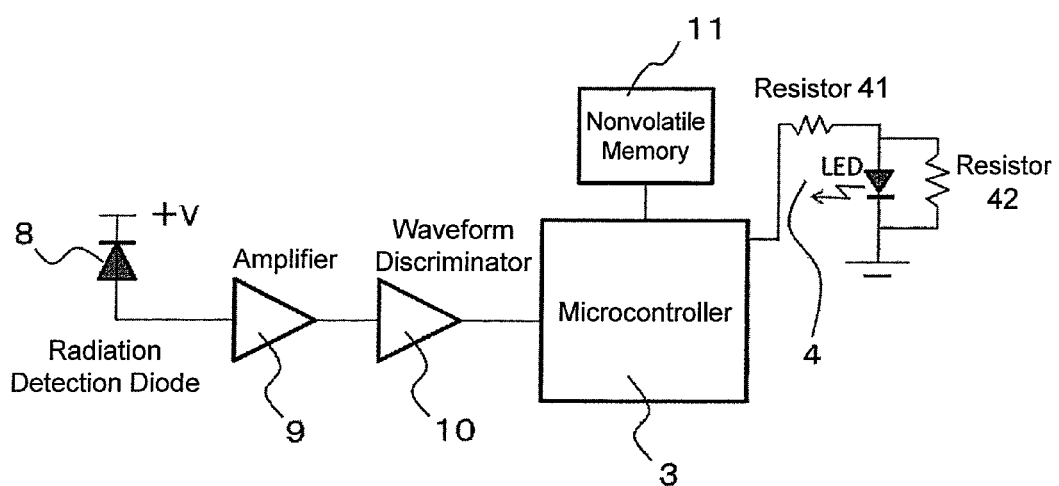
FIG. 2 is a block diagram of Embodiment 1.

As shown in FIG. 2, a radiation detection diode 8 that constitutes the radiation detection unit 2 is arranged in the main body unit 1, and the anode of the radiation detection diode 8 is input to an amplifier 9, while the cathode thereof is applied a positive voltage (reverse voltage) with respect to the anode voltage.

When radiation ($\gamma$ rays) is incident on the radiation detection diode 8, the anode thereof outputs a very small amount of current with a specific waveform, and the current is amplified with the amplifier 9. Then, a waveform discriminator 10, which removes noise, outputs a pulse signal only when it detects a specific pulse height, and then, the pulse signal is input to the microcontroller unit 3.

The radiation detection diode 8 generates noise with a further lower level than that of the very small amount of current that is generated upon incidence of radiation ($\gamma$ rays). However, such noise is removed by the waveform discriminator 10. Thus, the microcontroller unit 3 can measure the radiation dose by counting only current pulses that are generated upon incidence of radiation ($\gamma$ rays).

In usual measurement, the microcontroller unit 3 counts pulse signals from the waveform discriminator 10 every predetermined measurement time (e.g., 1 minute to 1 hour), and sequentially stores the counts into a nonvolatile memory 11.

When the thus measured counting rate of pulse signals corresponding to the radiation dose rate exceeds a threshold, or when the count number of pulse signals corresponding to the integrated dose for a predetermined period exceeds the safe upper limit, the microcontroller unit 3 issues a warning by lighting or blinking the LED 4 to inform that the radiation dose rate of the place where the wearer is now is extremely high or that the integrated dose is above the permissible value to prompt the wearer to immediately leave the place.

Meanwhile, when the wearer has finished his/her work and gets back to the base station, home, or the like, or when the wearer carries a management device including the display device and the input device 6 with him/her and wants to know a record of the dose at a place where the wearer is now, he/she inserts the main body unit 1 into the slot 61 provided in the input device 6 to which the display device is connected, so that the LED 4 of the main body unit 1 is located opposite the light-emitting/receiving element 62 of the input device 6. Upon detecting this, the light-emitting/receiving element 62 emits light with a predetermined pulse pattern toward the LED 4 of the main body unit 1, whereby a command can be issued.

As shown in FIG. 2, the LED 4 of the main body unit 1 is connected to the microcontroller unit 3 via a resistor 41, and a resistor 42 is connected in parallel with the LED 4.

Figure 3:
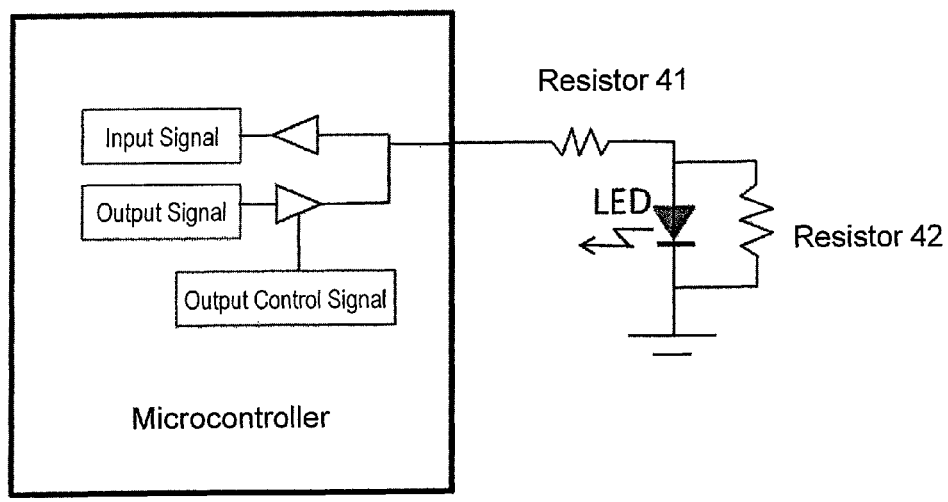
FIG. 3 is a diagram showing a LED input/output unit of Embodiment 1.

According to such a configuration, the LED 4 not only emits light by itself, but also outputs a voltage signal with the photoelectromotive force when it is irradiated with light. Thus, when the voltage signal is input to the microcontroller unit 3 via the resistors 42 and 41 as shown in FIG. 3, a command or data can be transmitted to the main body unit 1.

When the resistor 42 is not connected in parallel with the LED 4, the voltage signal at the anode of the LED 4 would be delayed in response to changes in the light intensity due to the capacitance across the opposite terminals of the LED 4 or the input capacitance of the terminal of the microcontroller. Meanwhile, when the resistor 42 is connected in parallel with the LED 4, the anode voltage of the LED 4 can be caused to follow changes in the light intensity.

When the resistor 41 has a resistance value in the range of 100Ω to 10 kΩ and the resistor 42 has a resistance value in the range of 10 MΩ to 1 GΩ, little current flows through the current-limiting resistor 41 in the input mode. Thus, no voltage drop occurs in the resistor 41, and the anode voltage of the LED 4 generated with the photoelectromotive force is applied to the terminal of the microcontroller unit 3. In the output mode in which a warning or data is transmitted, the resistor 42 has a sufficiently higher resistance than the resistor 41. Thus, current mainly flows through the LED 4 and the LED 4 emits light, so that the light can be used for transmission of a warning or data. As a light-emitting element for the light-emitting/receiving element 62 at this time, a high-luminance LED that emits light with a wavelength shorter than 600 nm is used.

For example, provided that the resistor 41 has a resistance of 1 kΩ, and the resistor 42 has a resistance of 100 MΩ, data communication from the input device 6 to the main body unit 1 can be conducted at a speed of several bps, and data communication from the main body unit 1 to the input device 2 can be conducted at a speed of greater than or equal to 300 bps.

When the LED 4 of the main body unit 1 detects a signal with a pulse pattern corresponding to a predetermined command from the light-emitting/receiving element 62 of the input device 6, the main body unit 1 is switched into the communication mode to establish optical communication between the LED 4 of the main body unit 1 and the light-emitting/receiving element 62 of the input device 6.

When a pulse pattern received by the light-emitting/receiving element 62 from the LED 4 is a command requesting a count that corresponds to the integrated radiation dose stored in the nonvolatile memory or a command requesting data corresponding to the radiation dose per predetermined time, the microcontroller 3 outputs the radiation dose rate data to the input/output device 2 in response to the command.

Accordingly, the computer and the like can display the integrated dose of the wearer or the radiation dose per predetermined time on the display.

It should be noted that the LED 4 may include a plurality of LEDs with the same color or different colors so that the dose rate can be represented by the number of lighted LEDs when the dosimeter is worn by the wearer. Alternatively, the level of the dose rate may be represented by shortening the blinking cycle or changing the colors of the LEDs in accordance with an increase in the dose rate.

Although the radiation detection diode 8 is used as the radiation detection element in this embodiment, it is needless to say that various objects such as a small Geiger-Mueller counter (GM counter) may also be used.

Further, it is also possible to, without providing the slot 61 in the input device 6, arrange the light-emitting/receiving element 62 on an end face of the input device 6, arrange the LED 4 of the main body unit 1 such that it is opposite the end face of the input device 6, and turn on a switch provided on the end portion, so as to allow transmission and reception of data between the input device 6 and the main body unit 1.

Embodiment 2

Figure 4:
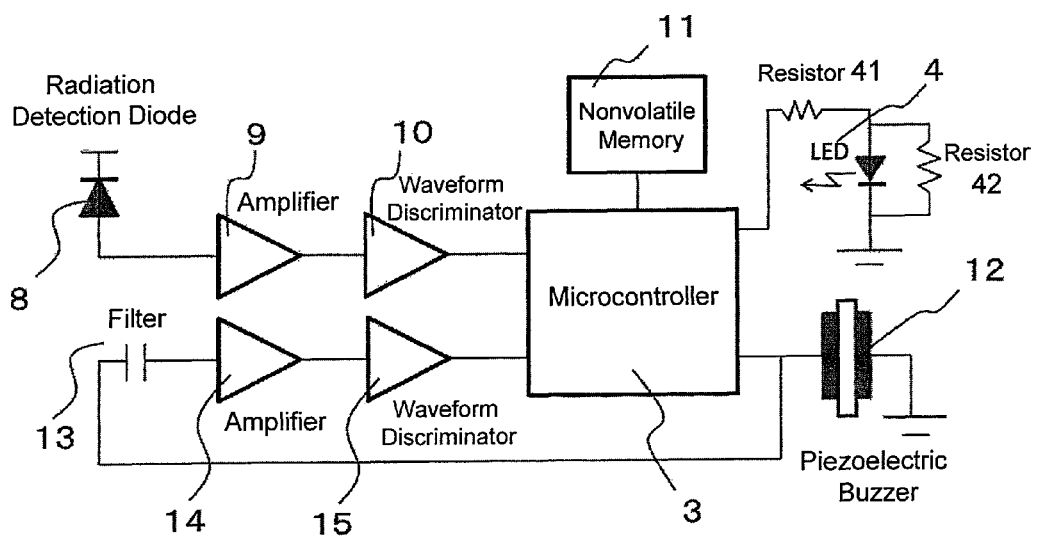
FIG. 4 is a block diagram of Embodiment 2.

In this embodiment, a piezoelectric buzzer 12 that issues a warning sound is added to Embodiment 1 as shown in FIG. 4.

There may be cases where a wearer who is working does not notice a warning if the LED 4 is just lighted or blinked, such as when the wearer carries the main body unit 1 of the radiation dosimeter in his/her breast pocket or the like using a clip. Thus, in this embodiment, when the radiation dose rate or the cumulative radiation exposure dose at that time exceeds the safety value, not only is the LED 4 lighted, but also a warning sound is issued using the piezoelectric buzzer 12.

In such a case, it becomes possible to inform the wearer of the level of the dosimeter by changing the sound volume or changing the warning sound interruption period in accordance with the dose rate.

By the way, when the radiation detection diode 8 is used as the radiation detection element, if the main body unit 1 of the radiation dosimeter is dropped or bumped against a hard object during working, there is a possibility that a pulse signal with a level that is about equal to or greater than when radiation (γ rays) is incident may be output due to the shock applied to the radiation detection diode 8 and the peripheral circuits thereof.

In such a case, it follows that the waveform discriminator 10 outputs, in addition to a pulse that is directly related to the dose of radiation generated when radiation (γ rays) is incident, a pulse generated due to the shock to the microcontroller unit 3. Therefore, a higher radiation dose than the original dose would be measured, which makes it difficult to perform management of an accurate dose rate. Further, a lighting warning of the LED 4 and a warning sound of the piezoelectric buzzer 12 would provide the wearer with a sense of anxiety.

Thus, in this embodiment, the piezoelectric element used as the piezoelectric buzzer 12 is also used as a shock sensor.

That is, a shock or vibration that is caused when the main body unit 1 is dropped or bumped against another object is detected by the piezoelectric element of the piezoelectric buzzer 12. The output of the piezoelectric element is input to the microcontroller unit 3 via a filter 13, which passes only signals with a frequency band that would adversely affect a detection signal of radiation, and filters out signals with other frequency bands such as low-frequency signals, an amplifier 14, and a waveform discriminator 15. As with the waveform discriminator 10, the waveform discriminator 15 outputs a pulse signal only when the input signal is above a given threshold, and inputs the pulse signal to the microcontroller unit 3.

The amount of current that is generated by the radiation detection diode upon detection of radiation is very small. Thus, when a strong shock or vibration is applied to the device, there is a possibility that the voltage of the amplifier 9 may fluctuate and exceed a threshold, which in turn may cause the waveform discriminator 10 to generate an erroneous detection signal or change the sensitivity to radiation.

Figure 5:
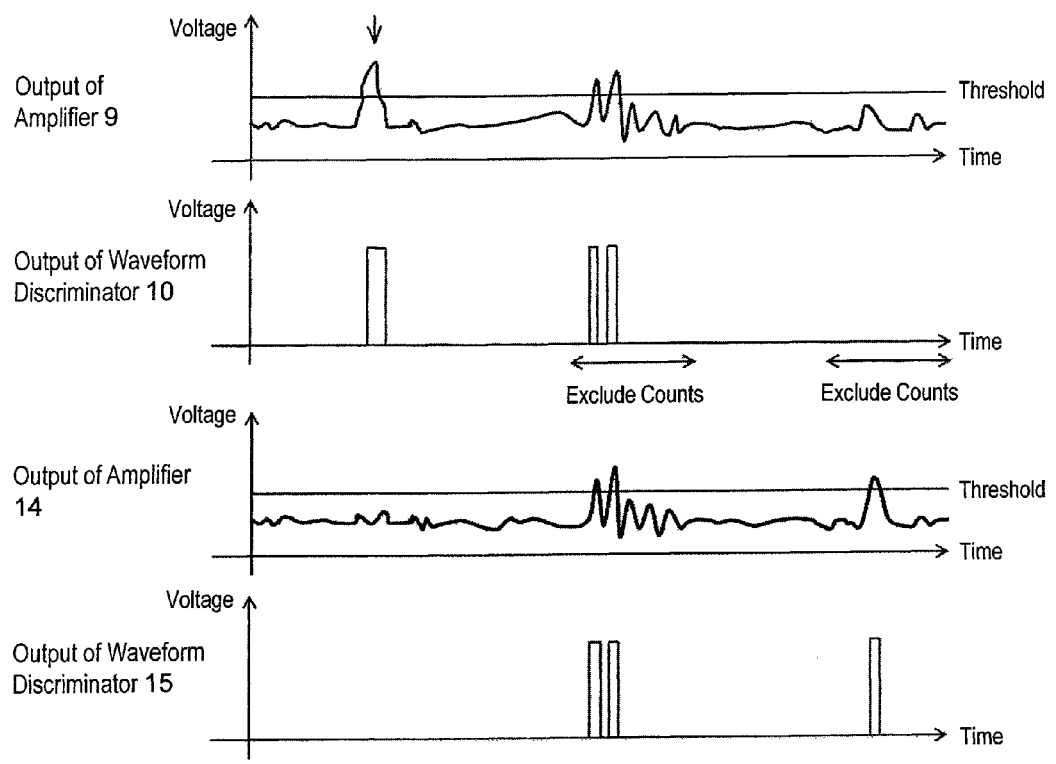
FIG. 5 is a diagram illustrating the noise removing effect of Embodiment 2.

Therefore, as shown in FIG. 5, when the voltage input from the piezoelectric element of the piezoelectric buzzer 12 via the filter 13, the amplifier 14, and the waveform discriminator 15 upon receiving a shock exceeds a threshold, the output of the amplifier 9 will also exceed a threshold. In such a case, even when the waveform discriminator 10 outputs a pulse, such pulse is removed as unnecessary information.

Meanwhile, even when the waveform discriminator 10 outputs no pulse, if the waveform discriminator 15 outputs a pulse, it is expected that the influence of the external noise and the like is strong. In such a case, the radiation dose measurement is regarded as unreliable, and predetermined periods of time preceding and following the current measurement are excluded from the measurement time, whereby it becomes possible to increase the reliability of the radiation dose measurement and surely avoid erroneous warnings. It should be noted that in FIG. 5, a peak of the output of the amplifier 9, which is indicated by the arrow, in the top diagram indicates a case where there is no shock or vibration, which represents a signal of radiation that should be originally measured.

Embodiment 3

Figure 6:
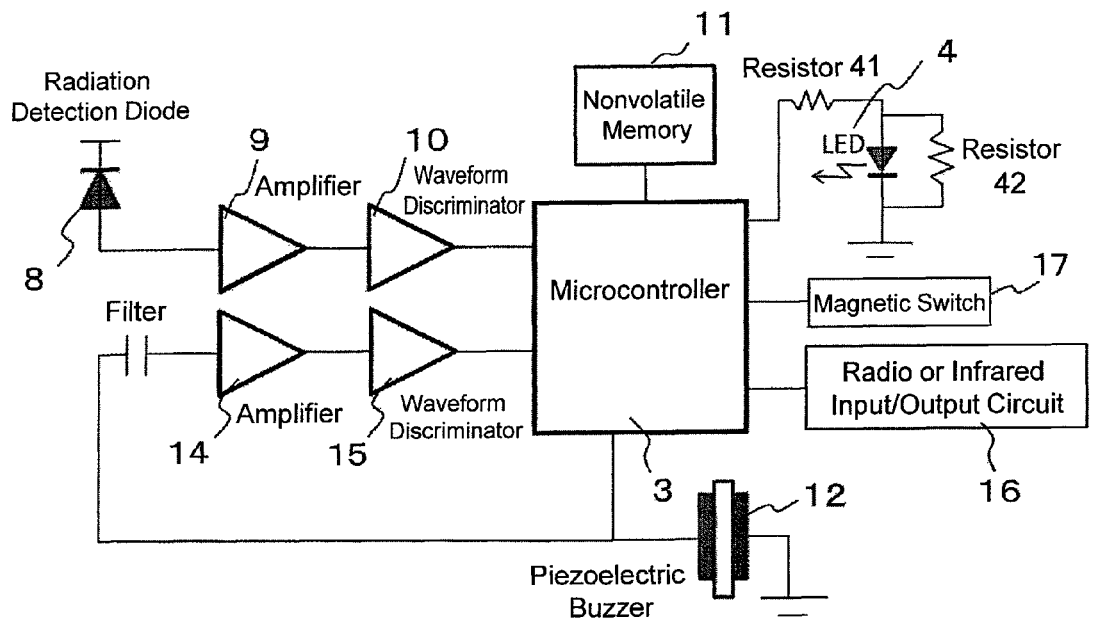
FIG. 6 is a diagram illustrating Embodiment 3.

When only optical communication of the LED 4 is used, the data transfer rate is low. Thus, it may take a long time to read detailed data that has been recorded or transmit a command to the main body unit 1. In order to solve this, in this embodiment, an input/output circuit 16 using radio waves or infrared rays and a magnetic switch 17 are added to Embodiment 2 as shown in FIG. 6. The magnetic switch 17 is turned on by a permanent magnet or the like disposed in the input device 6 when the main body unit 1 is inserted into the slot 61 of the input device 6 in FIG. 1.

When optical communication of the LED 4 and non-contact communication using the input/output circuit 16, which uses radio waves or infrared rays, are started at the timing when the magnetic switch 17 is turned on as a trigger, data can be transmitted and received with the minimum power consumption without operating a keyboard or the like of the display device 5 of the personal computer or the like.

Meanwhile, when only optical communication of the LED 4 is used, there is a possibility that due to fluctuations of the outside light, a signal similar to that in the optical communication may be generated even when the main body unit 1 is not inserted into the input device 6, which could result in an unwanted communication mode. However, if the dosimeter is configured to be switched into the communication mode only while the main body unit 1 is inserted into the input device 6 and the magnetic switch 17 is on, it is possible to prevent the communication mode from becoming active with the presence of noise and thus prevent unwanted power consumption.

In addition, it would be also effective to, by omitting the communication function that uses radio waves or infrared rays, prepare a unit that combines the simplified input device 6 and the display device 5 and a unit that combines the input device 6 with a wireless or infrared function and the display device 5, and selectively use one of them. That is, when usual check of the dose value is performed, the simplified unit may be used, while when acquisition of the detailed data, resetting, calibration, or the like is performed, the unit with a wireless or infrared function may be used, whereby the wearer would be able to frequently check the dose value using a dosimeter without a display device while suppressing the cost to the minimum.

In order to simplify a unit that combines the input device 6 and the display device 5, the display device 5 may be integrated with the input device 6 using a microcontroller chip, a liquid crystal display device, or the like to achieve a compact size, so that a manager at a site, the wearer, or the like may be able to carry the integrated unit as well as the main body unit 1 of the dosimeter with him/her.

Further, the input/output circuit 16, which uses radio waves, infrared rays, or the like, may also be used to perform communication for calibrating a plurality of dosimeters. That is, in performing calibration, it is necessary to irradiate each dosimeter with a given level of dose, determine a calibration constant from the dose level and a count number recorded by each dosimeter, and write the determined calibration constant into each dosimeter. Thus, it is also possible to save the labor for the calibration operation by providing a different ID to each radiation dosimeter and transmitting calibration data corresponding to the ID of each radiation dosimeter.

Embodiment 4

According to each of the dosimeters of Embodiments 1 to 3 above, the main body unit 1 does not have a display device, and a warning is issued using only the LED 4 and/or the piezoelectric buzzer 12, and further, the LED 4 is also used as an electrical non-contact input/output device. Thus, the dosimeter can be smaller in size and thickness than an ID card that is always carried by staff and the like.

Figure 7:
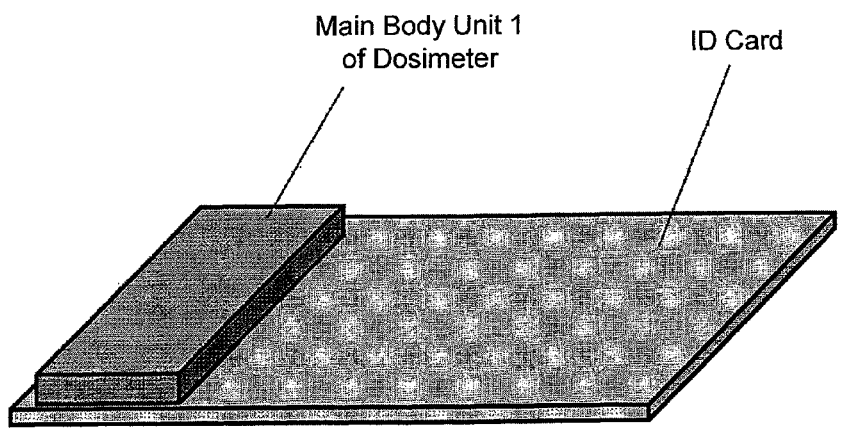
FIG. 7 is a diagram illustrating Embodiment 4.

As the measurement data can be read in an electrically non-contact manner, the main body unit 1 in this embodiment is bonded to an ID card or integrated with the ID card through casting or the like as shown in FIG. 7, or is put in a card holder together with the ID card so as to place the main body unit 1 and the ID card together to perform radiation dose measurement.

Accordingly, it is possible to manage the radiation exposure dose of each individual in association with the ID card information, and also reduce the possibility that the data may be lost in comparison with a case where the main body unit 1 is independently put in a pocket or the like. Further, when the main body unit 1 is put in a pocket, the main body unit 1 is likely to touch hard objects such as keys, and thus is easily subject to shocks. However, as a holder of an ID card is usually formed of a soft, transparent resin material, it is less easily subject to shocks, and thus, the possibility of erroneous detection due to shocks can be further reduced.

OTHER EMBODIMENTS

In each embodiment, when a GPS function is mounted on the main body unit 1 of the radiation dosimeter, and the positional information thereof as well as the radiation exposure dose measured by the radiation dosimeter is recorded with time, it becomes possible to more correctly identify an area with a high radiation dose, and automatically collect information such as specific areas that should be decontaminated.

Further, when a sleep mode is set on the radiation dosimeter to reduce power consumption, it is possible to cancel the sleep mode by inserting the main body unit 1 into the slot 61 of the input device 6 to allow the LED 4 to receive a specific pattern signal from the microcontroller unit 3. Then, transmission and reception may be started after checking whether communication of a measured radiation dose is required or not.

It should be noted that the sleep mode may be cancelled using a switch provided in the main body unit 1 of the radiation dosimeter, a wireless LAN of an office where a radiation management device is provided, or the like.

Further, it is also possible to provide a battery voltage detection element in the microcontroller unit 3 of the main body unit 1, and prompt the wearer to replace a battery or evacuate data on the radiation dose, which has been measured via the input device 6, in accordance with the remaining capacity of the battery, using the LED 4 or the piezoelectric buzzer 12.

By the way, if the wearer replaces the battery, the device may get broken. Thus, the main body unit 1 should have a structure that does not allow general users to replace the battery. Thus, it is necessary to adopt an operation of requesting a special service station or the like to replace the battery and perform recalibration.

When such an operation is adopted, a radiation dosimeter ID and a wearer ID are needed. When it takes a short time to replace the battery and perform recalibration, the same radiation dosimeter ID and the same wearer ID can be used as long as battery replacement and recalibration are performed on a dosimeter that has been used so far and the radiation dosimeter is returned to the same wearer.

However, when it takes a long time to replace the battery and perform recalibration, and a radiation dosimeter with a different ID is provided to the wearer, it is necessary to associate the radiation dosimeter ID with the wearer ID.

Such IDs may be associated on the database, but it is preferable to start a management system to associate IDs before providing a wearer with a dosimeter. In that case, if the wearer ID is stored together with the dosimeter ID in the nonvolatile memory 11 of the main body unit 1, it is possible to, even after replacing the battery, continue recording by identifying a wearer without accessing the database or the like. Accordingly, the radiation exposure dose of each wearer can be managed continuously and accurately even when a battery is replaced.

INDUSTRIAL APPLICABILITY

As described above, according to the present invention, a warning LED is also used as a non-contact input/output device, whereby the number of components and cost can be reduced, and data can be input/output without electrical contact. Furthermore, as a metal electrode need not be exposed to the outside, it is possible to avoid electrode-related troubles, such as contact failure, electrostatic discharge failure, and short circuit that would occur when the metal electrode becomes wet with rain and the like. Thus, the dosimeter of the present invention is expected to be widely used as a portable radiation dosimeter that can manage the radiation exposure dose for a long term without placing a burden on the wearer.

REFERENCE SIGNS LIST

1 Main body unit of portable radiation dosimeter
2 Radiation detection unit
3 Microcontroller unit
4 LED
5 Display of radiation management device
6 Input device
7 Cable
8 Radiation detection diode
9,14 Amplifier
10,15. Waveform discriminator
11 Nonvolatile memory
12 Piezoelectric buzzer
16 Input/output device
17 Magnetic switch

I claim:

1. A portable radiation dosimeter comprising a radiation detection element, the dosimeter being configured to measure and record a radiation exposure dose from a detection output of the radiation detection element, further comprising:

a LED configured to issue a warning to a user when a radiation exposure dose or a radiation dose rate exceeds a predetermined threshold, the LED being placed opposite a light-emitting/receiving unit of an electrical non-contact input device that is provided in a radiation dose management device with a display device, and being used to transmit and receive recorded radiation dose data and a command or data transmitted from the non-contact input device.

2. The portable radiation dosimeter according to claim 1 that uses a radiation detection semiconductor as the radiation detection element, further comprising:

a piezoelectric buzzer configured to issue a warning sound to a user using a piezoelectric element when the radiation exposure dose or the radiation dose rate exceeds a predetermined threshold, the piezoelectric element used for the piezoelectric buzzer being configured to detect a shock or vibration applied to a main body unit of the radiation dosimeter; and a noise removal device configured to remove noise generated due to the shock or the vibration from a radiation dose detection value obtained with the radiation detection semiconductor.

3. The portable radiation dosimeter according to claim 2, wherein the LED is configured to be, when the main body of the radiation dosimeter is inserted into a slot provided in the non-contact input device, located opposite a light-emitting/receiving element provided in the slot, and transmit and receive the recorded radiation dose data and a command or data transmitted from the non-contact input device.

4. The portable radiation dosimeter according to claim 3, wherein the main body of the radiation dosimeter is integrated with an ID card capable of personal identification or is put in a card holder together with the ID card so as to measure a radiation exposure dose.

5. The portable radiation dosimeter according to claim 2, wherein the main body of the radiation dosimeter is integrated with an ID card capable of personal identification or is put in a card holder together with the ID card so as to measure a radiation exposure dose.

6. The portable radiation dosimeter according to claim 1, wherein the LED is configured to be, when the main body of the radiation dosimeter is inserted into a slot provided in the non-contact input device, located opposite a light-emitting/receiving element provided in the slot, and transmit and receive the recorded radiation dose data and a command or data transmitted from the non-contact input device.

7. The portable radiation dosimeter according to claim 6, wherein the main body of the radiation dosimeter is integrated with an ID card capable of personal identification or is put in a card holder together with the ID card so as to measure a radiation exposure dose.

8. The portable radiation dosimeter according to claim 1, wherein the main body of the radiation dosimeter is integrated with an ID card capable of personal identification or is put in a card holder together with the ID card so as to measure a radiation exposure dose.

* * * * *